（12) United States Patent
Tanaka et al.

(10) Patent No.: US 7,509,898 B2
(45) Date of Patent: Mar. 31, 2009

(54) WORKPIECE MACHINING APPARATUS

(75) Inventors: Naoya Tanaka, Aichi Pref. (JP);
Toraharu Ryuta, Aichi Pref. (JP);
Nobuhiro Kawai, Aichi Pref. (JP)

(73) Assignee: Yamazaki Mazak Corporation (JP)

( * ) Notice: Subject to any disclaimer, the term of this patent is extended or adjusted under 35 U.S.C. 154(b) by 14 days.

(21) Appl. No.: 11/956,639

(22) Filed: Dec. 14, 2007

(65) Prior Publication Data

US 2008/0178719 A1   Jul. 31, 2008

(30) Foreign Application Priority Data

Jan. 31, 2007   (JP)   ............................ P2007-020392

(51) Int. Cl.
*B23B 25/00*   (2006.01)
*B23Q 1/24*   (2006.01)

(52) U.S. Cl. ............................... 82/164; 82/162; 82/117

(58) Field of Classification Search .................... 82/117, 82/118, 149, 162, 163, 164, 170; 269/71, 269/73

See application file for complete search history.

(56) References Cited

U.S. PATENT DOCUMENTS 2,877,676 A * 3/1959 Swanson et al. ............... 82/125
3,010,344 A * 11/1961 Christensen .................. 82/117
4,129,220 A * 12/1978 Peterson et al. ................ 414/17
4,766,703 A   8/1988 Rattazzini
5,108,117 A * 4/1992 Crossman et al. ........... 279/126
5,715,068 A   2/1998 Izor et al.
6,178,856 B1 * 1/2001 Caddaye et al. ................ 82/117
6,568,096 B1   5/2003 Svitkin et al.

FOREIGN PATENT DOCUMENTS

EP   0241070 A   10/1987
EP   0354393 A2   2/1990
JP   62-292351   12/1987

OTHER PUBLICATIONS

European Search Report for EP Patent Application No. 07121815.0, mailed Apr. 17, 2008, pp. 1-5.

* cited by examiner

*Primary Examiner*—Willmon Fridie
(74) *Attorney, Agent, or Firm*—Sheridan Ross P.C.

(57) ABSTRACT

A multitasking workpiece machining apparatus includes a pair of workpiece support devices supporting an elongated workpiece, first and second headstocks at positions outside of the workpiece support devices. The second headstock is capable of moving closer to and apart from the first headstock. Each workpiece support device respectively includes a travel drive device traveling between the first and second headstocks. A numerical control unit controls travel of each workpiece support device by synchronously controlling each travel drive device.

7 Claims, 8 Drawing Sheets

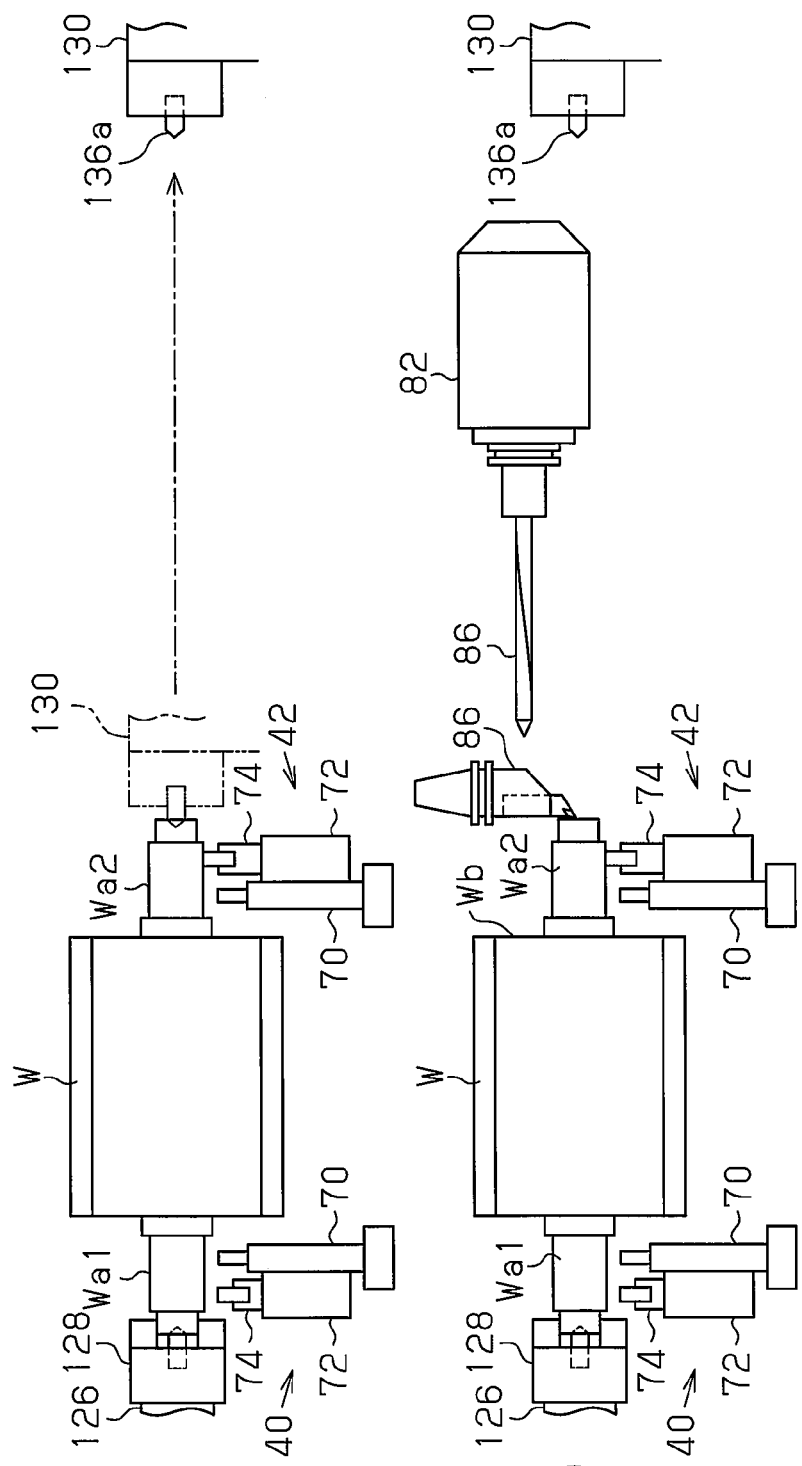

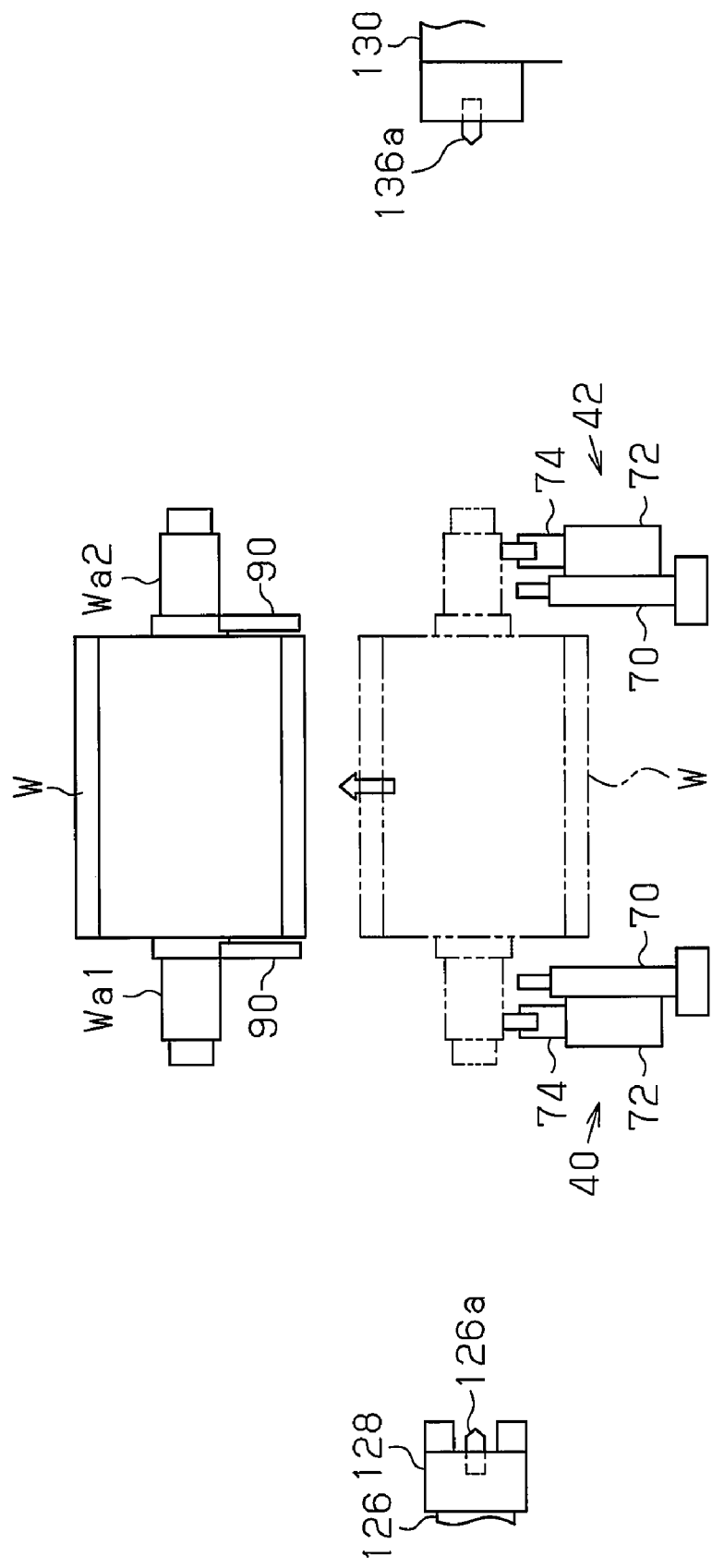

WORKPIECE MACHINING APPARATUS

BACKGROUND OF THE INVENTION

The present invention relates to an apparatus for machining an elongated workpiece such as a cylinder and a roller.

An elongated workpiece such as a roller for a printing machine is heavy and also large in size. Further, such a workpiece needs to be subjected to turning processing, milling processing and boring processing. When such a workpiece is machined with the use of a machining center in each process step, its setup takes time and a load on each process is increased. In this case, the workpiece is first suspended between a spindle and a tailstock of a workpiece machining apparatus by a crane. Subsequently, the workpiece is positioned by inching operation of the crane, and then held by the spindle and the tailstock. The workpiece is carried out of the apparatus after the machining and is manually transported to a machining machine for a subsequent process. In the subsequent process, the workpiece is again placed in the machining machine and removed from the machining machine.

As described above, when an elongated and heavy workpiece such as a roller for a printing machine is subjected to turning processing, milling processing and boring processing, the positioning of the workpiece between the spindle and the tailstock by inching operation of the crane is troublesome.

Japanese Laid-Open Patent Publication No. 62-292351 discloses a grinding machine provided with a pair of rests for supporting a workpiece between a work head (a spindle) and a counter head (a tailstock). Although Japanese Laid-Open Patent Publication No. 62-292351 discloses supporting of the workpiece by a pair of rests, the publication does not disclose that the workpiece is moved between the spindle and the tailstock by both rests.

SUMMARY OF THE INVENTION

Accordingly, it is an objective of the present invention to provide a workpiece machining apparatus capable of using workpiece support devices as a loader and facilitating automation of a workpiece movement by synchronously moving a plurality of work support devices between a spindle and a tailstock with a workpiece supported by a plurality of the workpiece support devices.

To achieve the foregoing objective and in accordance with a first aspect of the present invention, a workpiece machining apparatus for machining an elongated workpiece having first and second ends is provided. The apparatus includes a plurality of workpiece support devices supporting the workpiece, a rotation drive device fixing the first end of the workpiece and rotating the workpiece about the axis of the workpiece, a tailstock having a tailstock spindle that is pressed against the center of an end face of the workpiece at the second end of the workpiece, a plurality of travel drive devices provided in each workpiece support device, and a control device. Each travel drive device causes the each workpiece support to travel between the rotation drive device and the tailstock. The control device synchronously controls the travel drive devices, thereby controlling the travel of the workpiece support devices. The workpiece support devices are arranged between the rotation drive device and the tailstock. The workpiece is held tightly by a spindle of the rotation drive device and the tailstock spindle of the tailstock. The tailstock is capable of moving closer to and apart from the rotation drive device.

In accordance with a second aspect of the present invention, a workpiece machining apparatus for machining an elongated workpiece having first and second ends is provided. The apparatus includes a plurality of workpiece support devices supporting the workpiece, a first rotation drive device fixing the first end of the workpiece and rotating the workpiece about the axis of the workpiece, a second rotation drive device fixing the second end of the workpiece and rotating the workpiece about the axis of the workpiece, a plurality of travel drive devices provided in each workpiece support device, and a control device. Each travel drive device causes the each workpiece support to travel between the first and second rotation drive devices. The control device synchronously controls the travel drive devices, thereby controlling the travel of the workpiece support devices. The workpiece support devices are arranged between the first and second rotation drive devices. The workpiece is supported by at least either one of the first spindle of the first rotation drive device or the second spindle of the second rotation drive device. The second rotation drive device is capable of moving closer to and apart from the first rotation drive device.

BRIEF DESCRIPTION OF THE DRAWINGS

FIGS. 7(A) and 7(B) are explanatory diagrams of states of the workpiece at various processes; and FIG. 8 is an explanatory diagram of a state of the workpiece according to the second embodiment.

DETAILED DESCRIPTION OF THE PREFERRED EMBODIMENTS

Figure 1:
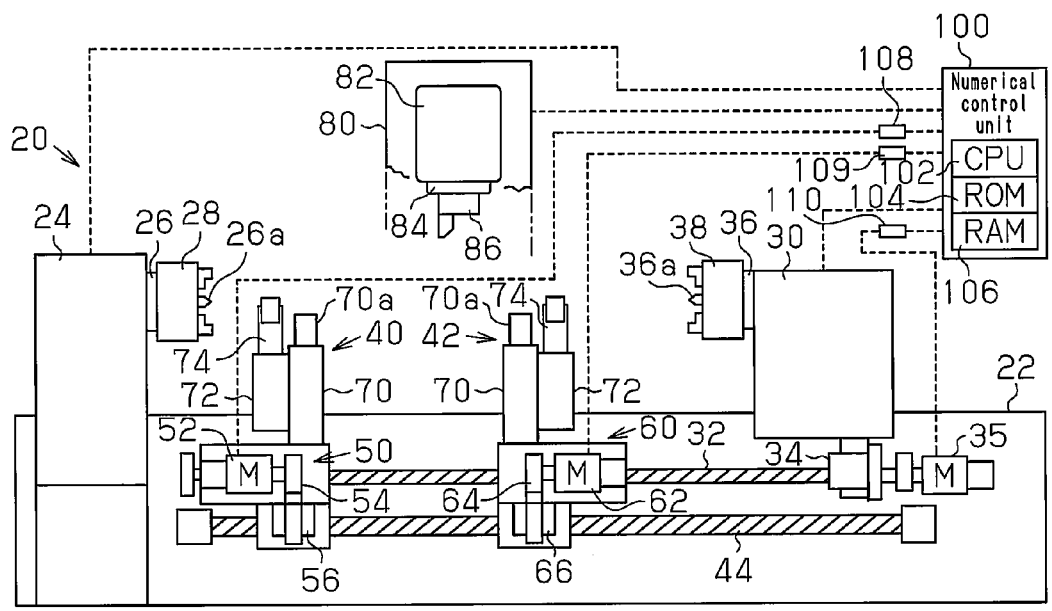
FIG. 1 is a schematic diagram showing an overall configuration of a multitasking workpiece machining apparatus according to a first embodiment.

Hereinafter, a multitasking workpiece machining apparatus according to a first embodiment of the present invention will be described with reference to FIGS. 1 to 5.

A multitasking workpiece machining apparatus 20 has a bed 22 whose end is provided with a first headstock 24 as a first rotation drive device. The first headstock 24 is provided with a first spindle 26, a chuck 28 and a tailstock spindle 26a. A second headstock 30 as a second rotation drive device is provided on the bed 22. The second headstock 30 is arranged so as to be opposed to the first headstock 24. The second headstock 30 is coupled to a ball screw 32 provided in the bed 22 with a nut 34. Upon rotation of the ball screw 32 by a servomotor 35, the second headstock 30 reciprocates along the longitudinal direction of the bed 22, thereby moving closer to and apart from the first headstock 24. The second headstock 30 includes a second spindle 36 having a common axis with the first spindle 26, a chuck 38 and a tailstock spindle 36a.

A pair of workpiece support devices 40 and 42 is provided between the first headstock 24 and the second headstock 30. On a lower portion of each workpiece support device 40, 42, travel drive devices 50, 60 are respectively provided. Each travel drive device 50, 60 includes a servomotor 52, 62, a gear mechanism 54, 64 and a nut 56, 66 respectively. Each servomotor 52, 62 is coupled to each nut 56, 66 with each gear mechanism 54, 64. Each nut 56, 66 is engaged with a ball screw 44 fixed with the bed 22. The travel drive devices 50 and 60 are individually or synchronously controlled by a numerical control unit 100 in order to cause each workpiece support device 40, 42 to travel.

Figure 2A:
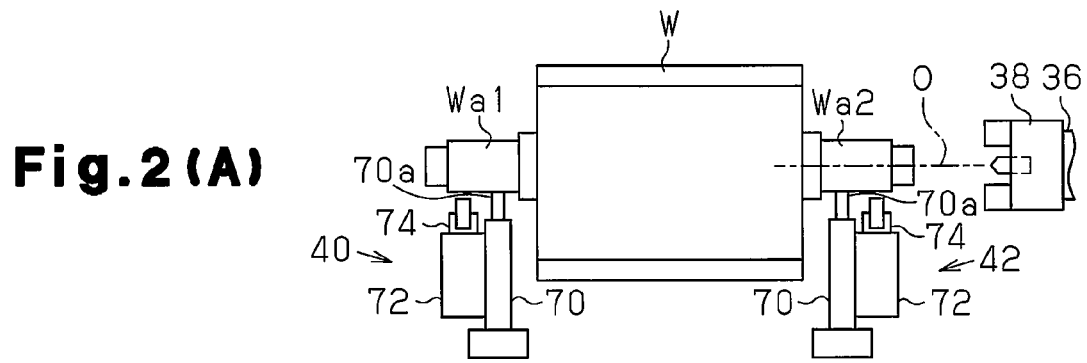
FIGS. 2(A) to 2(D) are explanatory diagrams of states of a workpiece at various processes.
Figure 2B:
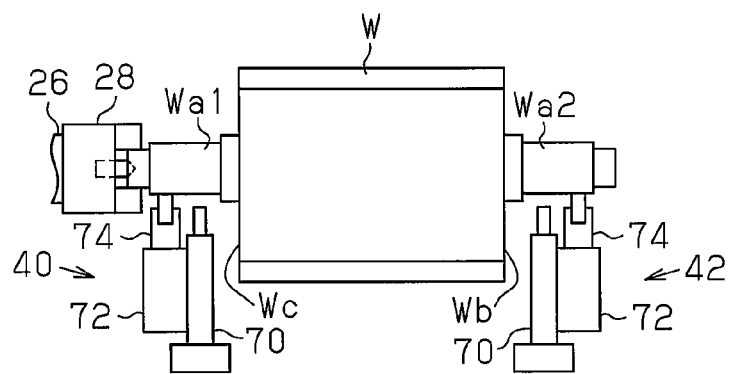
Figure 2C:
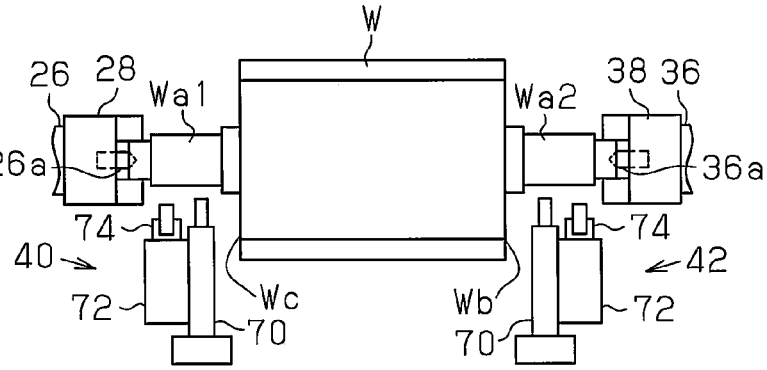
Figure 2D:
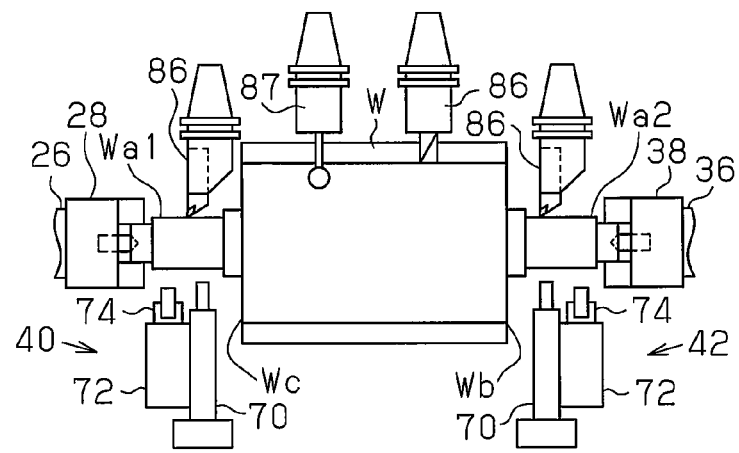

On an upper portion of each workpiece support device 40, 42, as shown in FIGS. 1 to 2(D), a support 70 is provided. Each of the supports 70 is provided with a steady rest device 72 having a self-centering mechanism. Each steady rest device 72 includes a plurality of openable steady arms 74. Each steady rest device 72 clamps a first shank (a first end) Wa1 of a workpiece W adjacent to the first spindle 26 and a second shank (a second end) Wa2 of the workpiece W adjacent to the second spindle 36 by the steady arms 74, respectively. At the time of clamping, the first and second shanks Wa1 and Wa2 are arranged coaxially to the first and second spindles 26 and 36 and also supported by the steady arms 74 so as not to be swayed. As the steady rest device 72, for example, a product model number SLU 5.1 of SMW-AUTOBLOK is used.

As shown in FIG. 1, the multitasking workpiece machining apparatus 20 comprises a column 80 above the bed 22, and the column 80 is provided with a tool rest 82. The column 80 is movable along the longitudinal direction of the bed 22. The column 80 can move closer to and apart from the axis of the first and second spindles 26 and 36. The tool rest 82 is vertically movable.

The tool rest 82 is provided with a tool holding portion 84, for which a tool 86 such as a rotating tool and a workpiece measuring instrument 87 are detachably provided, as shown in FIG. 2(D). A tool attached with the tool holding portion 84 can be exchanged with various tools by an automatic tool changer (not shown).

The numerical control unit 100 of the multitasking workpiece machining apparatus 20 will now be described.

The numerical control unit 100 as a control device includes a central processing unit (CPU) 102, a read-only memory (ROM) 104 and a random-access memory (RAM) 106. A machining program is stored on the RAM 106. The numerical control unit 100 controls rotation of the first and second spindles 26 and 36, movement of the column 80 and the tool rest 82, and rotation of the tool based on the machining program. The numerical control unit 100 also servo-controls each of the servomotors 35, 52 and 62 with drivers 108 to 110. Further, the numerical control unit 100 controls the opening and closing of the steady arms 74.

Next, various operations from carrying-in to carrying-out of the roll-shaped workpiece W to the multitasking workpiece machining apparatus 20 are described with reference to FIGS. 2(A) to 4(B). The second headstock 30 is arranged at its original position spaced apart from the first headstock 24 before the workpiece W is carried in as shown in FIG. 1. The various operations described below are performed by the numerical control unit 100 functioning as a control device.

1) Carrying-in of the workpiece W

As shown in FIG. 2(A), the workpiece W is suspended by, for example, a gantry (not shown) and carried into the multitasking workpiece machining apparatus 20. The workpiece W is placed on a temporary receiving portion 70a provided on the support 70 of each workpiece support device 40, 42. At this moment, the steady arm 74 of the steady rest device 72 in each workpiece support device 40, 42 is open in order to accept the first and second shanks Wa1 and Wa2 of the workpiece W. After that, the steady arm 74 of each steady rest device 72 clamps the first and second shanks Wa1 and Wa2 of the workpiece W, lifts the workpiece W up from the temporary receiving portion 70a of each workpiece support device 40, 42.

2) Movement of each workpiece support device 40, 42 and center boring

Subsequently, the workpiece support devices 40 and 42 are controlled in synchronization, moved toward the first spindle 26, whereby the workpiece W is carried to the first spindle 26, as shown in FIG. 2(B).

After the workpiece W is carried, the chuck 28 of the first spindle 26 grasps the first shank Wa1 of the workpiece W. Subsequently, clamping of the first shank Wa1 of the workpiece W by the steady arm 74 of the workpiece support device 40 is cancelled, and clamping of the second shaft Wa2 of the workpiece W by the steady arm 74 of the workpiece support device 42 is maintained.

In this state, the first spindle 26 rotates the workpiece W, and a tool on the tool rest 82 forms a center bore (not shown) on the center of an end face of the second shank Wa2.

Next, the steady arm 74 of the workpiece support device 40 clamps the first shank Wa1 of the workpiece W, and chucking of the first shank Wa1 of the workpiece W by the chuck 28 of the first spindle 26 is cancelled.

With the first and second shanks Wa1 and Wa2 of the workpiece W remaining clamped by the steady arms 74 of each workpiece support device 40, 42, the workpiece support devices 40 and 42 are controlled in synchronization, moved toward the second spindle 36 at its original position, whereby the workpiece W is carried to the second spindle 36.

After the workpiece W is carried, the chuck 38 of the second spindle 36 grasps the second shank Wa2 of the workpiece W. Subsequently, clamping of the second shank Wa2 of the workpiece W by the steady arm 74 of the workpiece support device 42 is cancelled, and clamping of the first shank Wa1 of the workpiece W by the steady arm 74 of the workpiece support device 40 is maintained.

In this state, the second spindle 36 rotates the workpiece W, and the tool on the tool rest 82 forms a center bore (not shown) on the center of an end face of the first shank Wa1.

Subsequently, the steady arm 74 of the workpiece support device 42 clamps the second shank Wa2 of the workpiece W, and chucking of the second shank Wa2 of the workpiece W by the chuck 38 of the second spindle 36 is cancelled. At this moment, the first shank Wa1 of the workpiece W remains clamped by the steady arm 74 of the workpiece support device 40.

After that, as shown in FIG. 2(B), the workpiece support devices 40, 42 are synchronously moved to the first spindle 26, whereby the workpiece W is carried to the first spindle 26.

3) Movement of the second headstock 30

The second headstock 30 is moved toward the first headstock 24.

4) Application of a thrust by the second headstock 30 to the workpiece W

The tailstock spindle 36a is fitted into the center bore of the second shank Wa2 of the workpiece W, as shown in FIG. 2(C). In this state, the tailstock spindle 36a is pressed against the workpiece W by a thrust of the second headstock 30. By this pressure, the workpiece W is pressed against the first headstock 24 with the tailstock spindle 26a fitted into the center bore of an end face of the first shank Wa1.

5) Subsequently, the steady arm 74 of each steady rest device 72 is opened to grasp the first shank Wa1 of the workpiece W by the chuck 28 of the first spindle 26 and grasp the second shank Wa2 of the workpiece W by the chuck 38 of the second spindle 36. The workpiece W may be simultaneously grasped by the first and second spindles 26 and 36. After that, clamping of the first and second shanks Wa1 and Wa2 of the workpiece W by the steady rest devices 72 of each workpiece support device 40, 42 is cancelled.

6) Machining operations

Subsequently, rough machining, semi-finishing, workpiece measuring and finish machining are carried out with the use of various tools 86 and the workpiece measuring instrument 87 while the first and second spindles 26 and 36 are rotated, as shown in FIG. 2(D).

Figure 3A:
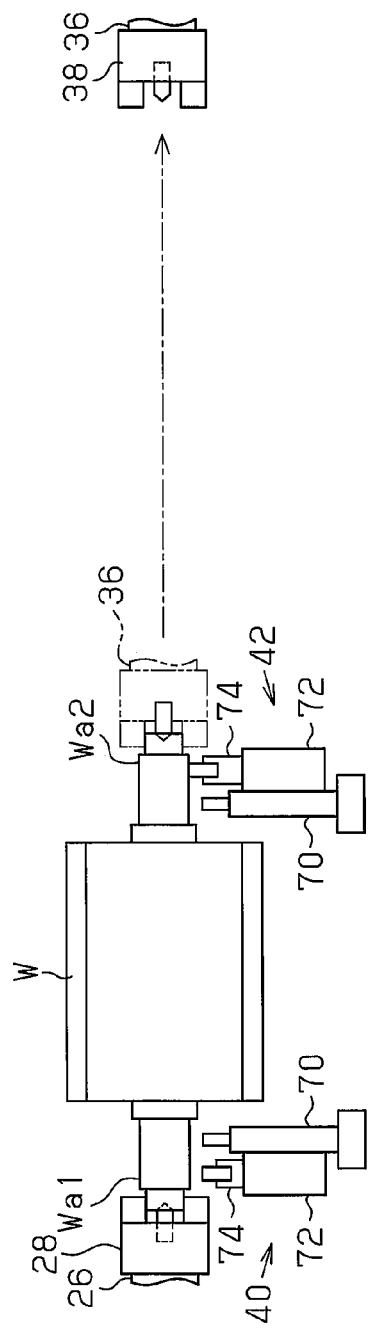
FIGS. 3(A) to (C) are explanatory diagrams of states of the workpiece at various processes.

7) As shown in FIG. 3(A), the second shank Wa2 of the workpiece W is clamped by the steady rest device 72 of the workpiece support device 42, and chucking of the second shank Wa2 of the workpiece W by the chuck 38 of the second spindle 36 is canceled. After that, the second headstock 30 is moved toward its own original position.

Figure 3B:
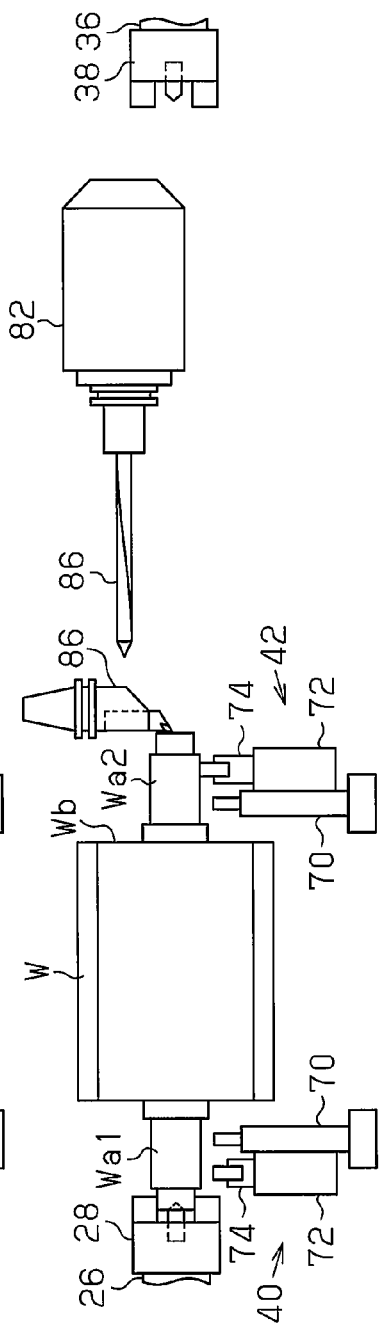

8) The second shank Wa2 and an end face Wb of the workpiece W supported by the workpiece support device 42 are machined with the use of the tools 86 with the first spindle 26 rotated or still, as shown in FIG. 3(B).

Figure 3C:
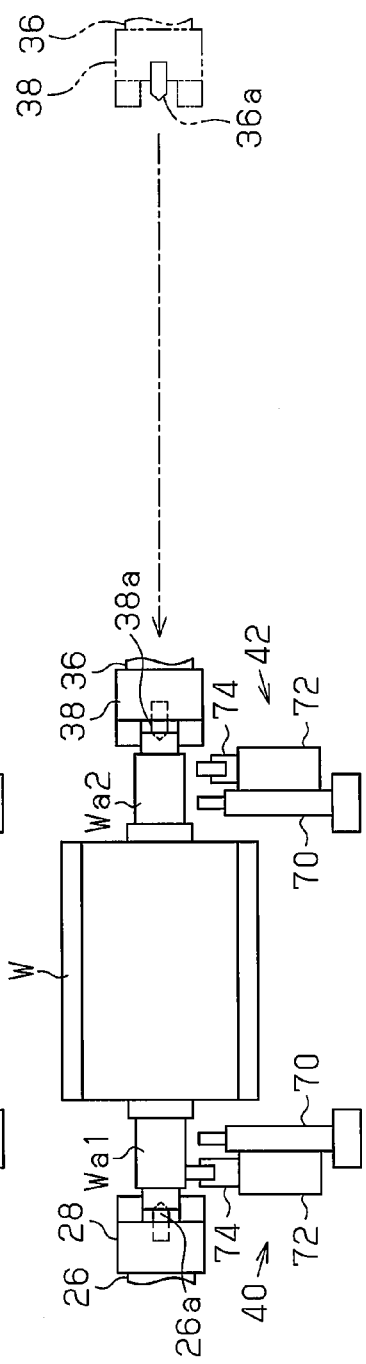

9) Next, the second headstock 30 is moved toward the first headstock 24 as shown in FIG. 3(C).

The tailstock spindle 36a is fitted into the center bore of the second shank Wa2 of the workpiece W as shown in FIG. 3(C). In this state, the tailstock spindle 36a is pressed against the workpiece W by a thrust of the second headstock 30. By this pressure, the tailstock 26a is fitted into the center bore of the first shank Wa1 of the workpiece W.

10) Then, the steady arm 74 of the workpiece support device 42 is opened to grasp the second shank Wa2 of the workpiece W by the chuck 38 of the second spindle 36. Subsequently, the steady rest device 72 of the workpiece support device 40 clamps the first shank Wa1 of the workpiece W. After that, chucking of the first shank Wa1 of the workpiece W by the chuck 28 of the first spindle 26 is cancelled.

Figure 4A:
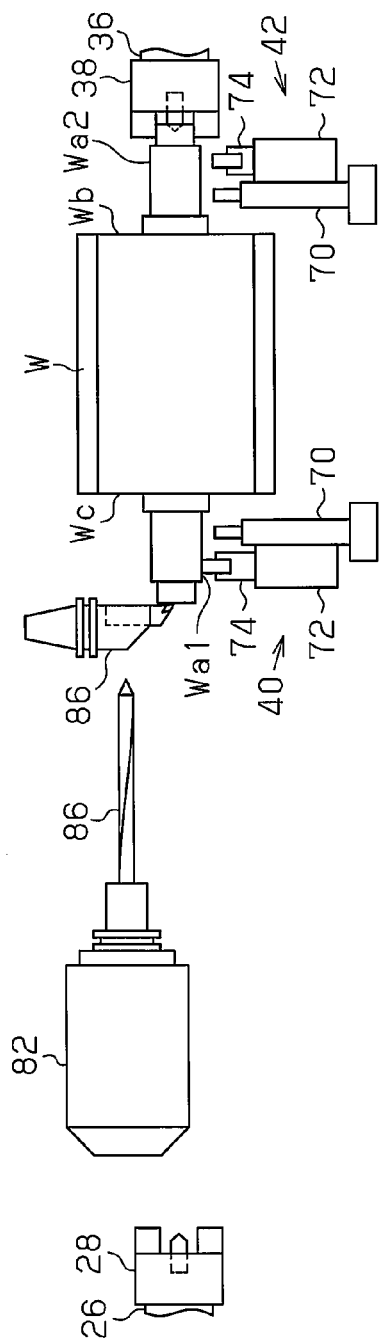
FIGS. 4(A) and 4(B) are explanatory diagrams of states of the workpiece at various processes.

11) Subsequently, each workpiece support device 40, 42 and the second headstock 30 are controlled in synchronization to be moved to the opposite direction of the first spindle 26 with the workpiece W supported by the second spindle 36 of the second headstock 30 and the workpiece support device 40, as shown in FIG. 4(A). In this way, the second headstock 30 is moved to its original position, whereby the workpiece W is carried to the original position of the second headstock 30.

12) Subsequently, as shown in FIG. 4(A), the first shank Wa1 and an end face Wc of the workpiece W supported by the workpiece support device 40 are machined by the tools 86 with the second spindle 36 rotated or still.

13) Carrying-out of the workpiece W

Next, the steady rest device 72 of the workpiece support device 42 clamps the second shank Wa2 of the workpiece W. Then, chucking of the second shank Wa2 of the workpiece W by the chuck 38 of the second spindle 36 is cancelled.

Figure 4B:
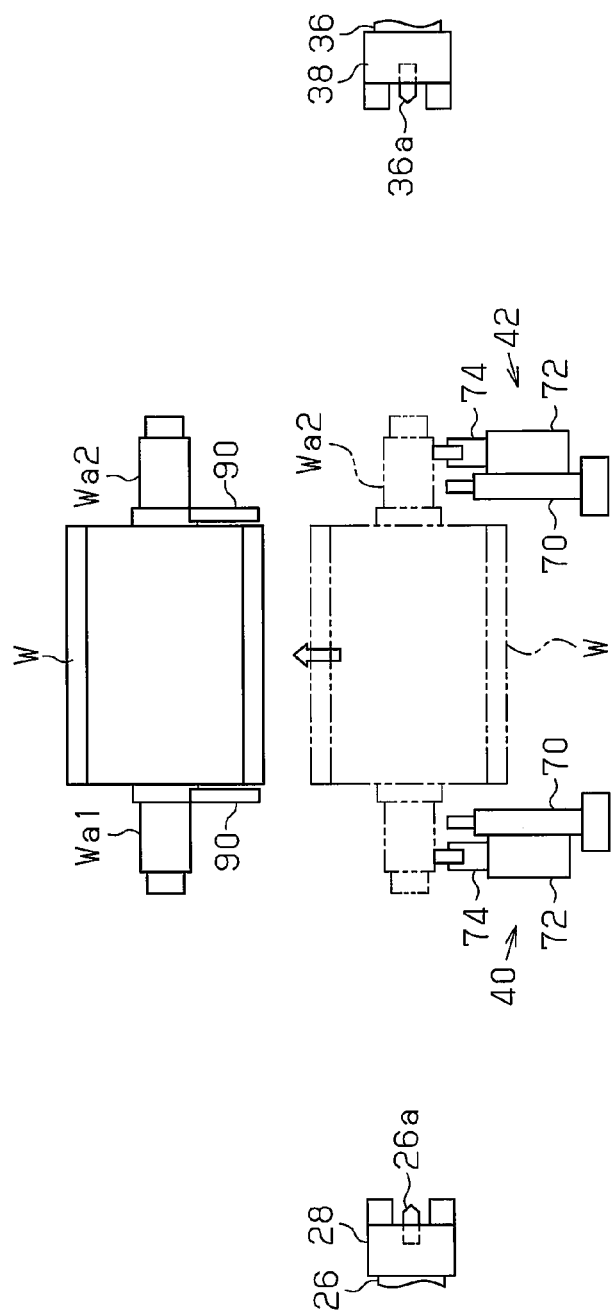
Figure 5:
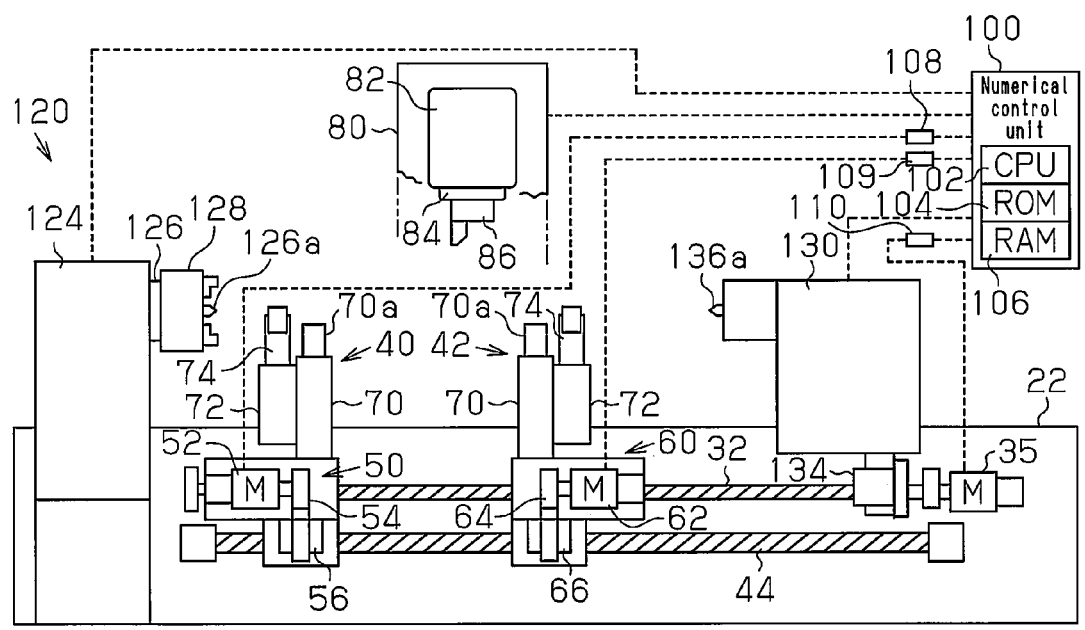
FIG. 5 is a schematic diagram showing an overall configuration of a multitasking workpiece machining apparatus according to a second embodiment.

While the first and second shanks Wa1 and Wa2 of the workpiece W remain clamped by the steady rest devices 72 of each workpiece support device 40, 42, the workpiece support devices 40, 42 are synchronously controlled to travel, whereby the workpiece W is moved to the middle of the first headstock 24 and the second headstock 30. After this, clamping of the workpiece W by the steady rest device 72 of each workpiece support device 40, 42 is cancelled. The workpiece W is carried out of the multitasking workpiece machining apparatus 20 by the gantry (not shown). The workpiece W is supported by a suspended member suspended from the gantry, as shown in FIG. 4(B).

In the multitasking workpiece machining apparatus 20 of the first embodiment, travel of each workpiece support device 40, 42 provided between the first and second headstocks 24 and 30 is configured to be controlled by synchronous control of each travel drive device 50, 60 when the workpiece W is grasped by the first or second spindle 26 or 36 and when the workpiece W is carried out.

As a result, each workpiece support device 40, 42 can be used as a loader by synchronously moving the workpiece W between the first and second headstocks 24 and 30 while the workpiece W remains supported by a pair of workpiece support devices 40 and 42. Consequently, automation of a workpiece movement is facilitated. In addition, the loader is an apparatus for supplying a workpiece to a predetermined position in a workpiece machining apparatus.

According to the multitasking workpiece machining apparatus 20 of the first embodiment, the numerical control unit 100 synchronously controls each travel drive device 50, 60 and the second headstock 30 to have them travel. As a result, the workpiece W can be moved in a state of being supported by the workpiece support devices and the second headstock 30. Consequently, all sorts of machining from a workpiece to a product can be carried out by a single apparatus.

Further, according to the multitasking workpiece machining apparatus 20 of the first embodiment, each workpiece support device 40, 42 includes the steady rest device 72 having a self-centering mechanism. For this reason, the axis O of the first and second spindles 26 and 36 and the axis of the workpiece can be aligned with each other when each workpiece support device 40, 42 is used as a loader. The subsequent machining can be started promptly.

Second Embodiment

Next, a multitasking workpiece machining apparatus 120 of a second embodiment will be described with reference to FIGS. 5 to 8. Detailed descriptions of configurations which are the same as or corresponding to those of the first embodiment are omitted.

The multitasking workpiece machining apparatus 120 of the second embodiment includes a tailstock 130 instead of the second headstock 30 of the first embodiment. The tailstock 130 is provided with a tailstock spindle 136a. The tailstock 130 is coupled to a ball screw 32 provided in the bed 22 with a nut 134. Upon rotation of the ball screw 32 by a servomotor 35, the tailstock 130 reciprocates along the longitudinal direction of the bed 22, thereby moving closer to and apart from a headstock 124. The tailstock 130 includes the tailstock spindle 136a having a common axis with a spindle 126. In the second embodiment, the headstock 124 corresponds to the rotation drive device.

Subsequently, various operations from carrying-in to carrying-out of a roll-shaped workpiece W to the multitasking workpiece machining apparatus 120 are described with reference to FIGS. 6(A) to 8. Center bores (not shown) are provided in advance at the center of end faces of first and second shanks Wa1 and Wa2 of the workpiece W. Further, the tailstock 130 is arranged at its own original position spaced apart from the headstock 124 before carrying-in the workpiece W, as shown in FIGS. 6(A) to 6(D).

1) Carrying-in of the workpiece W

Figure 6A:
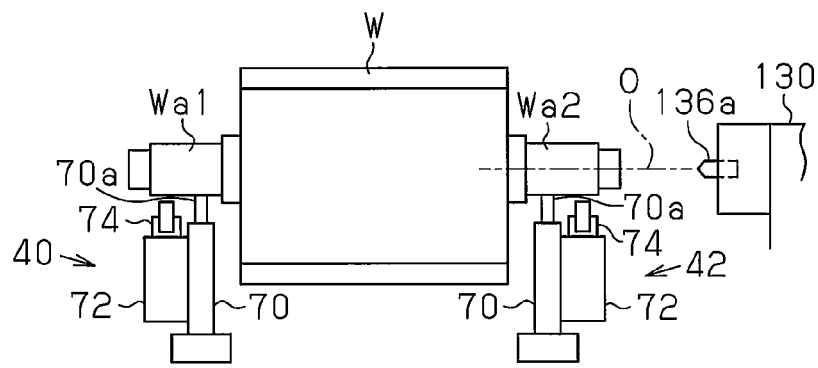
FIGS. 6(A) to 6(D) are explanatory diagrams of state of a workpiece at various processes.

As shown in FIG. 6(A), the workpiece W is suspended by, for example, a gantry (not shown) and carried into the multitasking workpiece machining apparatus 120. The workpiece W is placed on a temporary receiving portion 70a of each workpiece support device 40, 42. At this moment, a steady arm 74 of a steady rest device 72 in each workpiece support device 40, 42 is open in order to accept the first and second shanks Wa1 and Wa2 of the workpiece W. After that, the steady arm 74 of each steady rest device 72 clamps the first and second shanks Wa1 and Wa2 of the workpiece W and lifts the workpiece W up from the temporary receiving portion 70a of each workpiece support device 40, 42.

2) Movement of the workpiece support devices 40 and 42

Figure 6B:
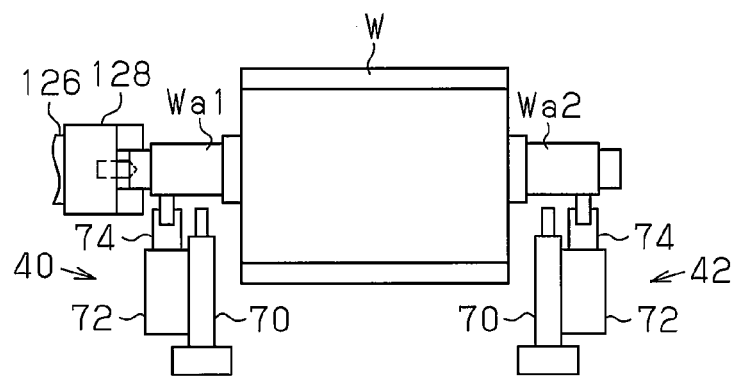

Next, as shown in FIG. 6(B), the workpiece support devices 40, 42 are controlled in synchronization to be moved toward the spindle 126, whereby the workpiece W is carried to the spindle 126.

3) Movement of the tailstock 130

The tailstock 130 is also moved toward the headstock 124.

4) Application of a thrust by the tailstock 130 to the workpiece W

Figure 6C:
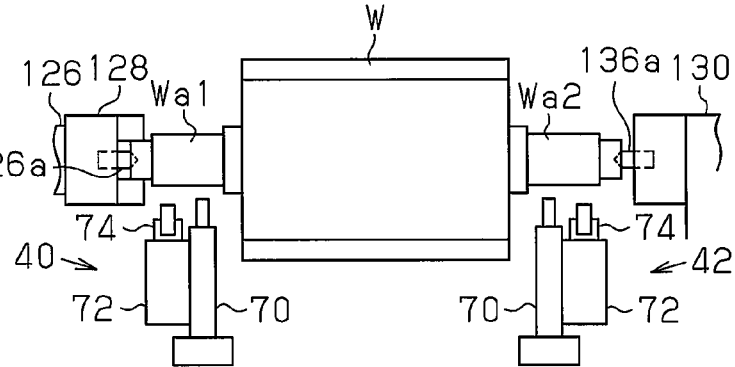

As shown in FIG. 6(C), the tailstock spindle 136a is fitted into the center bore of the second shank Wa2 of the workpiece W. In this state, the tailstock spindle 136a is pressed against the workpiece W by a thrust of the tailstock 130. By this pressure, the workpiece W is pressed against the headstock 124 with the tailstock spindle 126a fitted into the center bore on an end face of the first shank Wa1.

5) Subsequently, the steady arm 74 of each workpiece support device 40, 42 is opened, and a chuck 128 of the spindle 126 grasps the first shank Wa1 of the workpiece W. After that, clamping of the first and second shanks Wa1 and Wa2 of the workpiece W by the steady rest device 72 of each workpiece support device 40, 42 is cancelled.

6) Machining operation

Figure 6D:
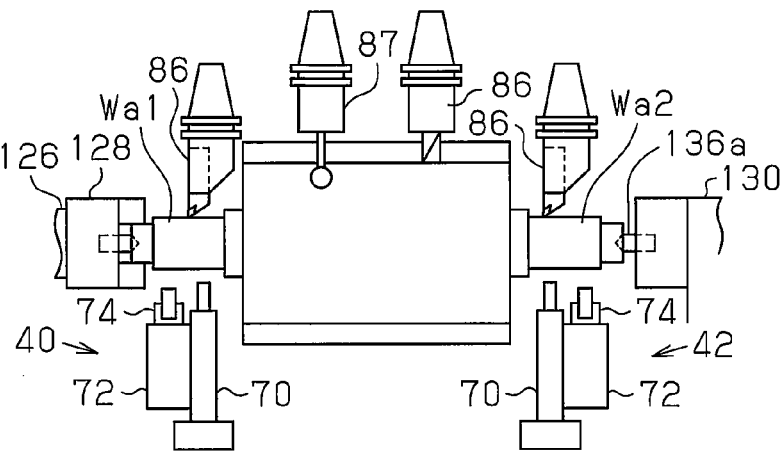

Following this, rough machining, semi-finishing, workpiece measuring and finish machining are conducted with the use of various tools 86 and a workpiece measuring instrument 87 while the spindle 126 is rotated, as shown in FIG. 6(D).

7) The steady rest device 72 of the workpiece support device 42 clamps the second shank Wa2 of the workpiece W, and the tailstock 130 is moved toward its own original position, as shown in FIG. 7(A).

8) Subsequently, as shown in FIG. 7(B), the second shank Wa2 and an end face Wb of the workpiece W supported by the workpiece support device 42 are machined by the tools 86 with the spindle 126 rotated or still.

9) Carrying-out of the workpiece W

Next, the steady arm 74 of each workpiece support device 40, 42 clamps the first and second shanks Wa1 and Wa2 of the workpiece W. After that, chucking of the workpiece W by the chuck 128 of the spindle 126 is cancelled. With the first and second shanks Wa1 and Wa2 of the workpiece W remaining clamped by the steady arms 74 of each workpiece support device 40, 42, the workpiece support devices 40 and 42 are synchronously controlled and moved, whereby the workpiece W is moved to the middle of the headstock 124 and the tailstock 130. After this, clamping of the workpiece W by the steady rest device 72 of each workpiece support device 40, 42 is cancelled. The workpiece W is carried out of the multitasking workpiece machining apparatus 120 by the gantry (not shown).

In the multitasking workpiece machining apparatus 120 of the second embodiment, travel of each workpiece support device 40, 42 provided between the headstock 124 and the tailstock 130 is configured to be controlled by synchronous control of each travel drive device 50, 60 when the workpiece W is grasped by the spindle 126 and when the workpiece W is carried out.

As a result, each workpiece support device 40, 42 can be used as a loader by synchronously moving the workpiece W between the spindle 126 and the tailstock 130 while being supported by a pair of workpiece support devices 40 and 42. Consequently, automation of workpiece movement is facilitated.

Further, according to the multitasking workpiece machining apparatus 120 of the second embodiment, each workpiece support device 40, 42 includes the steady rest device 72 having a self-centering mechanism. For this reason, the spindle 126 and the axis O of the tailstock spindle 136a of the tailstock 130 and the axis of the workpiece W can be aligned with each other when each workpiece support device 40, 42 is used as a loader. Accordingly, the subsequent machining can be started promptly.

The embodiments of the present invention may be modified as follows, for example.

If the roll-shaped workpiece has one or two portions with smaller diameters on its intermediate portion, the multitasking workpiece machining apparatus may include three or four workpiece support devices in total by providing the workpiece support devices with one or two steady rest devices 72 supporting the places with the smaller diameters in each of the aforementioned embodiments. Similarly, the multitasking workpiece machining apparatus may include five or more workpiece support devices having the steady rest device 72 with a self-centering mechanism.

In each of the foregoing embodiments, each workpiece support device 40, 42 may be moved by a linear motor instead of each servomotor 52, 62.

The workpiece is not limited to roll-shaped one, but may be in any shape in each of the embodiments.

The invention claimed is:

1. A workpiece machining apparatus for machining an elongated workpiece having first and second ends, the apparatus comprising:
a plurality of workpiece support devices supporting the workpiece;
a rotation drive device fixing the first end of the workpiece and rotating the workpiece about the axis of the workpiece;
a tailstock having a tailstock spindle that is pressed against the center of an end face of the workpiece at the second end of the workpiece;
a plurality of travel drive devices provided in each workpiece support device, wherein each travel drive device causes the each workpiece support to travel between the rotation drive device and the tailstock; and
a control device that synchronously controls the travel drive devices, thereby controlling the travel of the workpiece support devices,
wherein the workpiece support devices are arranged between the rotation drive device and the tailstock, the workpiece is held tightly by a spindle of the rotation drive device and the tailstock spindle of the tailstock, and the tailstock is capable of moving closer to and apart from the rotation drive device.

2. The workpiece machining apparatus according to claim 1, wherein the workpiece support devices support the workpiece coaxially to the spindle of the rotation drive device and the tailstock spindle of the tailstock.

3. The workpiece machining apparatus according to claim 1, wherein the rotation drive device comprises a tailstock spindle that is pressed against the center of an end face of the workpiece at the first end of the workpiece.

4. A workpiece machining apparatus for machining an elongated workpiece having first and second ends, the apparatus comprising:
a plurality of workpiece support devices supporting the workpiece;
a first rotation drive device fixing the first end of the workpiece and rotating the workpiece about the axis of the workpiece;

a second rotation drive device fixing the second end of the workpiece and rotating the workpiece about the axis of the workpiece;

a plurality of travel drive devices provided in each workpiece support device, wherein each travel drive device causes the each workpiece support to travel between the first and second rotation drive devices; and a control device that synchronously controls the travel drive devices, thereby controlling the travel of the workpiece support devices, wherein the workpiece support devices are arranged between the first and second rotation drive devices, the workpiece is supported by at least either one of the first spindle of the first rotation drive device or the second spindle of the second rotation drive device, and the second rotation drive device is capable of moving closer to and apart from the first rotation drive device.

5. The workpiece machining apparatus according to claim 4, wherein the control device synchronously controls the travel drive devices and the second rotation drive device, thereby causing the travel drive devices and the second rotation drive device to travel.

6. The workpiece machining apparatus according to claim 4, wherein the workpiece support devices support the workpiece coaxially to the first spindle of the first rotation drive device and the second spindle of the second rotation drive device.

7. The workpiece machining apparatus according to claim 4, wherein the first and second rotation drive devices each comprise a tailstock spindle that is pressed against the center of an end face of the workpiece.

* * * * *